United States Patent [19]

Rouse et al.

[11] Patent Number: 5,353,581
[45] Date of Patent: * Oct. 11, 1994

[54] MULCHING BLADE INCLUDING MULTIPLE CUTTING EDGES

[75] Inventors: Russell V. Rouse, Conyers; Frank H. Hancock, Jr., McDonough; James R. Powers, Conyers, all of Ga.

[73] Assignee: Fugua Industries, Inc., McDonough, Ga.

[*] Notice: The portion of the term of this patent subsequent to Jan. 6, 2010 has been disclaimed.

[21] Appl. No.: 12,619

[22] Filed: Feb. 2, 1993

Related U.S. Application Data

[63] Continuation of Ser. No. 810,816, Dec. 19, 1991, Pat. No. 5,199,251.

[51] Int. Cl.⁵ ............... A01D 34/72; A01D 34/73
[52] U.S. Cl. .................................. 56/255; 56/295
[58] Field of Search ............................ 56/255, 295

[56] References Cited

U.S. PATENT DOCUMENTS

| | | | |
|---|---|---|---|
| Re. 32,377 | 3/1987 | Seyerle | 56/295 |
| 750,329 | 1/1904 | Windingstad | 56/295 |
| 2,547,540 | 4/1951 | Roberts | 56/255 |
| 2,669,084 | 2/1954 | Warren | 56/295 |
| 2,682,142 | 6/1954 | Warren | 56/295 |
| 2,697,322 | 12/1954 | Watrous | 56/295 |
| 2,760,327 | 8/1956 | Bowee | 56/255 X |
| 2,815,631 | 12/1957 | Northcote et al. | 56/320.2 |
| 2,857,729 | 10/1958 | Zoldok | 56/295 |
| 2,891,369 | 6/1959 | Rietz | 56/295 X |
| 2,908,128 | 10/1959 | Mauro | 56/295 |
| 3,080,697 | 3/1963 | Mauro | 56/295 |
| 3,093,952 | 6/1963 | Bonser | 56/295 |
| 3,162,990 | 12/1964 | Cook | 56/295 |
| 3,183,655 | 5/1965 | Dunlap et al. | 56/295 |
| 3,220,170 | 11/1965 | Smith et al. | 56/295 X |
| 3,477,214 | 11/1969 | Rogers | 56/295 |
| 3,482,380 | 12/1969 | Stair | 56/295 |
| 3,538,692 | 11/1970 | Cope et al. | 56/295 |
| 3,686,841 | 8/1972 | Mager et al. | 56/295 X |
| 3,703,071 | 11/1972 | Anderson | 56/295 |
| 3,780,509 | 12/1973 | Woelffer | 56/295 |
| 4,189,903 | 2/1980 | Jackson et al. | 56/295 X |
| 4,318,268 | 3/1982 | Szymanis | 56/255 |
| 4,628,672 | 12/1986 | Jones | 56/295 |
| 4,977,735 | 12/1990 | Davis | 56/295 |
| 5,199,251 | 4/1993 | Rouse et al. | 56/255 |

Primary Examiner—George A. Suchfield
Attorney, Agent, or Firm—Jones & Askew

[57] ABSTRACT

A grass or vegetation cutting blade is provided, which includes multiple cutting edges, including a leading cutting edge positioned below a trailing cutting edge. An upturned foil is provided behind the leading edge, such that grass initially cut by the leading edge is directed upwardly by the foil toward the trailing edge, to be cut in midair. An inturned spur is provided, which provides inward air and clipping flow toward the rotational axis of the blade. The blade is contemplated for use in conventional side- or rear-discharging housings, as well as mulching or recycling housings. The blade is resistant to clogging, and includes power-efficient properties.

9 Claims, 3 Drawing Sheets

MULCHING BLADE INCLUDING MULTIPLE CUTTING EDGES

This is a continuation of application Ser. No. 07/810,816, filed Dec. 19, 1991, now U.S. Pat. No. 5,199,251.

TECHNICAL FIELD

The present invention generally relates to grass cutting blades, and more particularly relates to a grass cutting blade which includes multiple cutting edges, which may be used in a variety of grass cutter housings, and may be used to process grass clippings in a variety of ways.

BACKGROUND OF THE INVENTION

Rotary lawn mowers and grass cutting blades serving to cut grass or other vegetation are well known in the art today. Typically a grass cutting blade, also referred to as a "cutting bar" is rotated about a generally vertical axis within a downwardly opening housing in order to cut grass by rapid vertical movement of one or more cutting edges defined by the cutting blade. The rotating blade may also include one or more air-fanning "foils" or "vanes" which serve to create air movement into, about, and out of the cutting housing to transport cut clippings either out of a discharge opening (where it can be bagged or broadcast sidewardly away from the housing), or downwardly onto and into the cut grass, where it preferably may be allowed to decompose.

In the instance where the grass clippings (or other cut organic matter such as leaves, weeds, etc.,) are caused to be transported downwardly onto the cut grass, it has been found to be desirable to cut the clippings as finely as possible, and to dispense such grass clippings between the cut grass blades and onto the ground surface. This process, often referenced in the art by descriptive terms such as "mulching", "composting", or "recycling", allows the clippings to decompose with minimal interference with the growing of the cut grass. Upon decomposition, the clippings may nourish the growing grass.

In the prior art, it has been known to provide different cutting blades and blade housing configurations to adapt to the particular type of cutting desired. For example, certain blades have been found to be acceptable for bagging or side-discharging of clippings, while other blades have been found to be best suited for mulching. However, it is obviously advantageous to provide a single type of blade and accompanying housing which may provide both functions.

Although many different cutting blade configurations are known in the prior art, disadvantages do exist. Some such disadvantages include clogging of the cut grass within the housing or on the blade, due to inadequate cutting of the grass, or inadequate air flow within the blade housing. Other disadvantages include uneven dispersal of the clippings, unacceptable power consumption, and difficulties in resharpening.

U.S. Pat. No. 3,780,509 to Woelffer entitled "Rotary Lawn Mower Cutter Bar Width Bi-Level Cutter", issued Dec. 25, 1973, discloses a grass cutting blade including a pair of cutters on each opposite end of the blade. The pair of cutters includes an upper and lower blade, with the upper blade in rotational advance of the other blade, so that the leading upper cutter will cut the grass prior to being cut by the trailing lower cutter. A air-fanning blade is also provided to create a flow air to convey the clippings from the blade and through the outlet of the mower.

U.S. Pat. No. 2,760,327 to Bovee, entitled "Housing for Disc Type Power Mower", issued Aug. 28, 1956, discloses a lawn mower which includes a pair of cutting blades 31, 30, the upper of which may be in slight rotational advance of the lower blade 30.

U.S. Pat. No. 3,477,214 to Rogers, entitled "Rotor Assembly for a Shredder Implement", issued Nov. 11, 1960, discloses a shredder implement including multiple cutting blades, some of which are vertical spaced from the other and may pivot about their own axis.

U.S. Pat. No. 2,547,540 to Roberts, entitled "Power Mower", issued April 3, 1951, discloses a power mower including a cutter bar 33, itself including multiple cutting blades 36.

U.S. Pat. No. 2,697,322 to Watrous, entitled "Cutter Member for Rotating Disk Type Lawn Mowers", issued Dec. 21, 1954, discloses a power lawn mower including multiple cutting blades such as 15, 16, which may be vertically spaced apart. The cutting blades 15, 16, include corresponding air propelling flanges 18 at their rear margins.

U.S. Pat. No. 2,908,128 to Mauro, entitled "Cutting Device for Rotary Mowers", issued October 13, 1959, discloses a rotary mower including multiple cutting edges.

U.S. Pat. No. 3,703,071 to Anderson, entitled "Rotary Blade for Mulching Lawn Mower", discloses a rotary blade for a power-driven lawn mower which includes an elongate body terminating at each end in a plurality of integral cutting fingers parallel to and displaced successively below and above the plane of the body of the rotary blade.

U.S. Pat. No. 4,318,268 to Szymanis, entitled "Mulching Lawn Mower", discloses a mulching lawn mower which includes a toroidal portion bounded by concentric skirt walls wherein the cross sectional area of the toroid increase towards the inner skirt. A cutting blade 26 is twisted in a particular configuration to provide flipping movement as shown in FIG. 2.

U.S. Pat. No. 4,977,735 to Davis, entitled "Lawn Sculpturing Method and Apparatus", issued Dec. 18, 1990, discloses several grass cutting blades which may be used to provide sculpturing effects in lawns, due to multiple cutting edges at various vertical heights.

U.S. Pat. No. 2,682,142 to Clark, entitled "Cutter Element for Rotary Mowers", issued Jun. 29, 1954, discloses cutting elements in spaced-apart relationships to provide an improved cutting path. FIG. 4 illustrates the interaction of two such cutting blades, one having one cutting edge at each end, and the other having two cutting edges with the upper cutting edge being provide to reduce "streaking", or unmown areas between the adjacent cutter units during turning operations.

U.S. Pat. No. 3,080,697 to Mauro, entitled "Cutting Blade for Rotary Mower", issued Mar. 12, 1963, discloses a lawn mower cutting blade which includes a plurality of cutting edges, such cutting edges in spaced-apart relationships to provide different cutting actions depending on the rotation of the reversible cutting blade.

U.S. Pat. No. 2,857,729 to Zoldok, entitled "Rotary-Type Mower Blade", issued Oct. 28, 1958, discloses a mower blade including not only vertical cutting edges, but also inclined cutting edges.

U.S. Pat. No. 3,538,692 to Cope, entitled "Grass Mowing and Mulching Device", issued Nov. 10, 1970, discloses a grass cutting blade including a plurality of cutting edges. The blade includes not only at each end a horizontal cutting edge 4, as well as a plurality of chopping edges 7, positioned behind the cutting edge 4.

U.S. Pat. No. 4,628,672 to Jones, entitled "Rotary Cutter", issued Dec. 16, 1986, discloses a cutter blade including multiple cutting edges, including slicing edges at the extreme ends of the blade.

U.S. Pat. No. 2,669,084 to Warren, entitled "Rotary Mower Blade", issued Feb. 16, 1954, discloses a cutting blade including vertical pivotable cutting blades 15, each of which include a trailing curved portion 23.

U.S. Pat. No. 2,891,369 to Rietz, entitled "Rotary Shredder and Cutter", issued Jun. 23, 1959, discloses a farm-type implement including a shredder bar member, which includes a downwardly-turned hook 215, sharpened at its leading edge as shown in FIG. 5.

U.S. Pat. No. 3,220,170 to Smith, entitled "Vegetation Mower and Blade", issued Nov. 30, 1975, discloses a cutting blade including cutting edges and an upwardly-turned flanges to provide air flow.

Reissue Patent No. 32,377 to Seyerle, entitled "Cutter Blade for Pneumatically Transporting Grass Clippings", reissued on Mar. 24, 1987, discloses a cutter blade including an upturned flange for transporting grass clippings.

As may be seen, it is known to provide various cutting blades or cutter bars which include multiple cutting edges and which may include upturned or down turned air foils to provide improved air flow. However, disadvantages do exist in the prior art.

Therefore it may be seen that a need exists for a grass cutting blade which may be used to bag, broadcast, or mulch grass clippings, which cuts the clippings finely. A need also exists for a grass cutting blade which eliminates or minimizes clogging of the clippings on the blade or within the housing, and which provides uniform dispersion of the clippings below the cut grass surface when in its "mulching" mode. A need also exists for a grass cutting blade which is easily made by mass production techniques, and which may be easily resharpened. Finally, a need exists for a grass cutting blade which is efficient in its use of power under a variety of cutting conditions.

SUMMARY OF THE INVENTION

The present invention solves deficiencies in the prior art by providing a cutting blade which may be used to bag, broadcast, or mulch grass clippings, and which cuts the clippings finely. The grass cutting blade eliminates or minimizes clogging of the clippings on the blade or within the housing, and provides uniform dispersion of the clippings below the cut grass surface when in its "mulching" mode. The grass cutting blade is readily made by mass production techniques, and may be easily resharpened. The grass cutting blade is efficient in its use of power under a variety of cutting conditions.

Generally described, the present invention comprises a multi-edge grass cutting blade with a leading edge lower than a trailing edge, and a foil member configured to direct grass cut by the leading edge into the path of the trailing edge.

It is an object of this invention to provide a grass cutting blade which produces grass clippings of short lengths, to thereby facilitate improved collection, compaction, decomposition, and general handling of the clippings from the moment of cut to the moment of discharge.

It is a further object of the present invention to provide a cutting blade which meets present day safety standards.

It is a further object of this object of this invention to provide a cutting blade which may be easily formed in a manufacturing process.

It is another object of the present invention to provide a grass cutting blade which is readily and economically provided with an air-fanning foil which creates the desired flow of air for adequate discharge of the clippings either downwardly into the grass surface or into a receiving bag.

It is further object of the present invention to provide a grass cutting blade which discourages clogging of grass clippings not only on or about the blade, but within the grass cutting housing.

It is a further object of the present invention to provide a grass cutting blade which is efficient in the use of power.

It is a further object of the present invention to provide a grass cutting blade which uniformly distributes grass clippings into the grass below the cut height and preferably on to the ground.

It is a further object of the present invention to provide a grass cutting blade which discourages "blow out" of grass clipping from apertures other than the downwardly-disposed housing opening.

It is a further object of the present invention to provide a grass cutting blade which provides consistent clipping dispersion.

It is a further object of the present invention to provide a grass cutting blade which provides consistent clipping dispersion under a variety of operating conditions.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Figure 1:
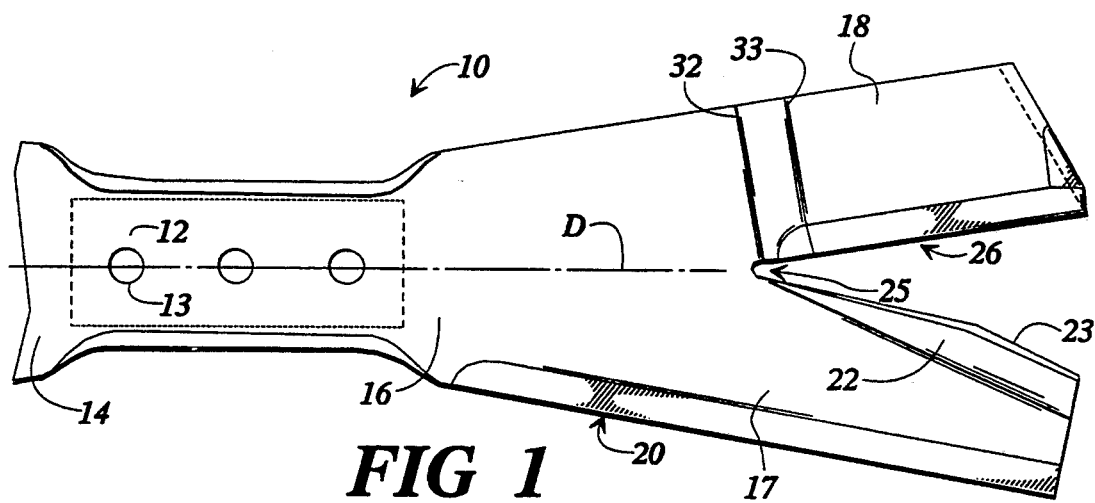
FIG. 1 is a partial top plan view of a first embodiment 10 of a cutting blade according to the present invention.

Referring now to the drawings, in which like numerals designate like elements throughout the several views, FIGS. 1–11 illustrate various cutting blades and their interaction with grass cutter housings.

It may be understood that there is a certain degree of symmetry embodied in all of the cutting blades illustrated. For purposes of this discussion, it will be referred to as "rotational symmetry", in that one viewing the cutting blade would see the same configuration each time the cutting blade is rotated 180 degrees.

It may also be understood that certain orientational terms will be used in this discussion for clarity, but which should not be used as limiting. For example, in this discussion is will be assumed that the blade is rotating around a substantially vertical axis, and cutting a generally horizontal path. However, it is of course understood that the blade could be used on inclined surfaces, within reason, such that the rotational axis of the blade, as well as the cutting path, could be inclined.

FIRST PREFERRED EMBODIMENT

General Configuration

Referring now to FIG. 1, a grass cutting blade 10 includes a central mounting portion 12 (defining a plurality of mounting holes 13), and two oppositely-extending ends 14, 16. Each of these ends includes a pair of cutting elements such as 17, 18, on end 16.

As may be seen, the cutting elements 17, 18 each include at least one cutting edge. The leading cutting element 17 includes a cutting edge 20, and also includes an upwardly-turned foil portion 22. The rear cutting element 18 includes two cutting edges: an "axial" cutting edge 26 and another cutting edge 28. This cutting edge 28 is not straight, due to the turned-down nature of a downturned spur 30 which partially defines this edge.

As discussed in further detail, the flange portion 22 is located "behind" the leading cutting edge 20, such that grass clippings which are initially cut by the leading cutting edge 20 pass along the upper surface of the leading cutting element and are then directed upwardly into the cutting path of the trailing cutting edge 26 as well as the edge 28 to a certain extent. As discussed in further detail, the edge 28 of a downturned spur 30 provides some cutting action, and the downturned spur directs some downwardly and inward air flow towards the rotational axis R of the blade 10.

Detailed Discussion

For purposes of this discussion, the forward cutting element 17 is distinguished from the rear cutting element 18 by the dividing dotted line D illustrated in FIG. 1. A crotch point 25 is also present where the elements meet.

Figure 2:
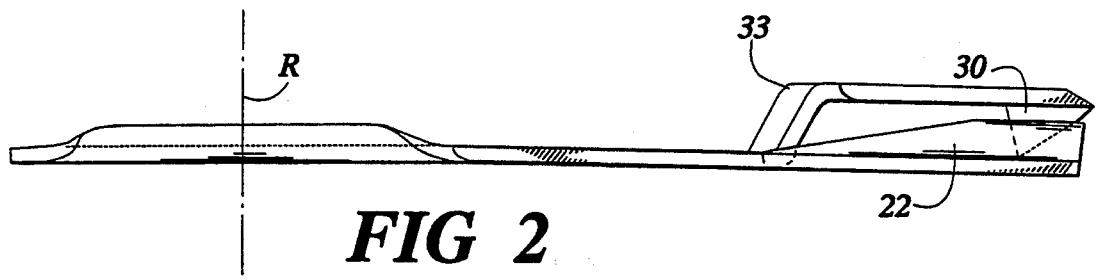
FIG. 2 is a partial side plan view of the cutting blade of FIG. 1.
Figure 3:
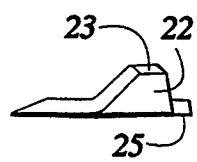
FIG. 3 is an end view of the leading cutting member 17 of the blade of FIG. 1.
Figure 4:
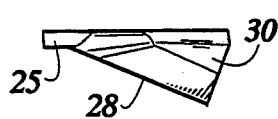
FIG. 4 is an end view of the trailing cutting member 18 of the blade of FIG. 1.
Figure 5:
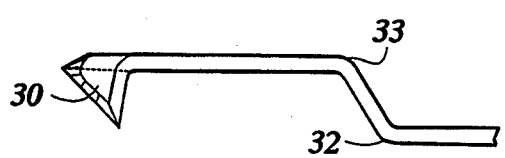
FIG. 5 is "trailing" view of the trailing cutting member 18 of the blade of FIG. 1.
Figure 6:
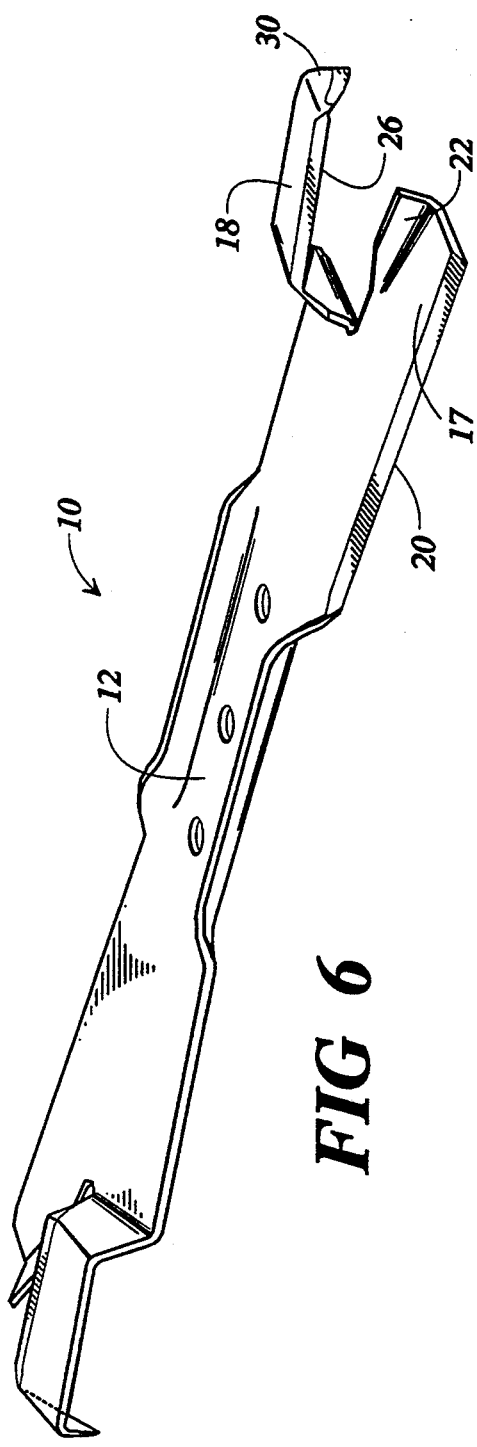
FIG. 6 is a partial pictorial view of the blade of FIG. 1.
Figure 7:
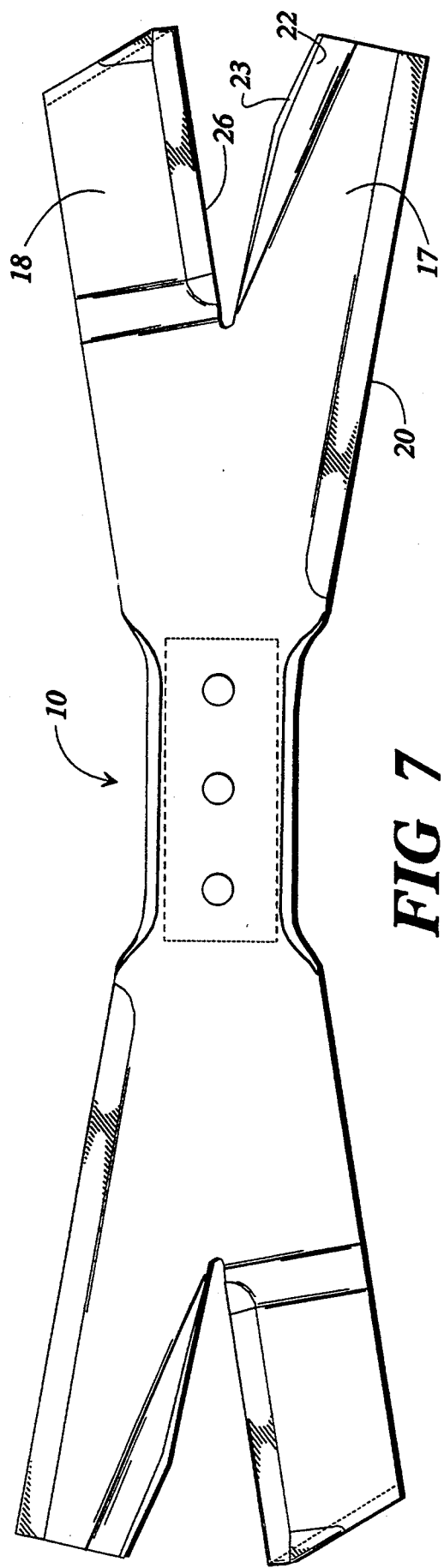
FIG. 7 is a top plan view of the blade of FIG. 1.

The leading cutting edge 20 of the leading cutting element 17 is lower, as seen in FIG. 2, than the trailing cutting edge 26 of the trailing cutting element 18. Each of these edges 20, 26 are substantially parallel to each other, but are not exactly horizontal, due to a slight "draft" (approximately 2 degrees) in each end of the blade, which extend from the relatively flat mounting portion.

Behind the leading edge 20 in relation to the grass clipping path is an upturned foil or flange 22, extending rearwardly from the leading cutting element 17. It may be seen that the upturned foil 22 is "cropped" or truncated at 23, such that the edge travels in a path which is substantially parallel to the cutting path of the trailing cutting edge. The reasons for such cropping is illustrated in reference to FIG. 2. As may be seen, this cropping allows a maximum amount of grass clippings to be directed towards the trailing edge 26, with grass clippings not being pushed above the trailing edge due to an overly high portion of the foil.

The trailing cutting element 18 includes two bends 32, 33, which allows the outer portion of the trailing cutting element 18 to be positioned above the front cutting element 17, although other configurations are contemplated. These bends may be "locked" by means of locking dimples (not shown) provided at the bend line.

The trailing cutting element 18 also includes a downturned and inturned member or "spur" 30, which provides desired air flow characteristics. It was found by the inventors that the provision of such a spur creates a desired degree of air flow downwardly and also towards the rotational axis of the blade, thus reducing radial or other "blow out", or other undesired escape of the grass clippings from the cutter housing. As may be seen, the major planar surfaces of the spur are not tangential to the rotation of the blade, instead they are inclined inwardly and downwardly such that as the blade rotates, the inner surface of the spur tends to cause air and clipping flow to be directed inwardly and downwardly toward the rotational axis of the blade. Some cutting by the edge 28 is also effected.

The spur 30 partially defines the cutting edge 28, with the remaining portion of the edge being defined by a flat portion of the trailing cutting member at its end. It may be seen, therefore, that the cutting edge 28 could be considered two cutting edges or portions, a first substantially horizontal cutting edge portion which is substantially tangential to the rotation of the blade, and a second cutting edge portion which is defined by the spur and is inclined from horizontal, and which lies along an axis which is not tangential relative to the rotation of the cutting blade.

The mounting portion 12 of the blade is conventional with respect to the applicant's particular "SNAPPER" models. However, it of course may be understood that different mounting configurations could be used to attach to other models requiring different mounting schemes, For example, the mounting portion could also be flat (as opposed to U-shaped) to adapt to a lawn mower requiring a flat mounting area.

It should be understood that the provision of a lower leading edge followed by a trailing upper edge provides improved power efficiency; instead of progressively shortening grass blades (as does Woelffer '509), grass clippings made airborne by the leading, lower, edge are subsequently cut "in midair" by the trailing, upper, edge. This "midair" cutting may occur immediately after the grass has been severed from the ground, or may also occur upon recirculation of the clippings within the cutter housing.

SECOND PREFERRED EMBODIMENT

Figure 8:
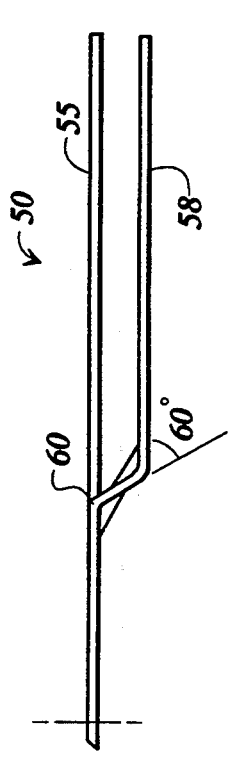
FIG. 8 is a partial side plan view of a second embodiment 50 of a cutting blade according to the present invention.
Figure 9:
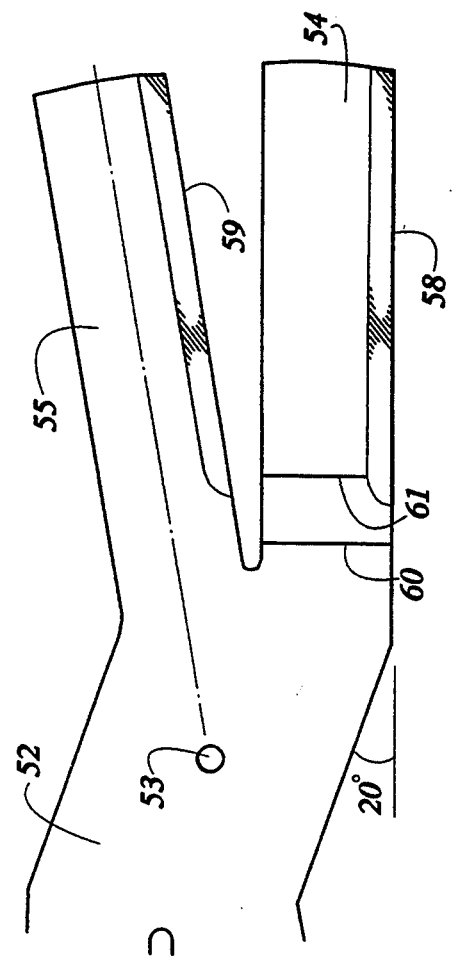
FIG. 9 is a partial top plan view of the cutting blade 50 of FIG. 8.

Referring now to FIGS. 8 and 9, a second blade embodiment 50 is illustrated, which includes a mounting portion 52 defining a center hole 53, and also including a leading cutting element 54, and a rear cutting element 55. The leading cutting element defines a cutting edge 58, and the trailing cutting element defines a cutting edge 59.

It may be seen that in the second blade embodiment 50, the leading cutting element 54 includes a pair of bends 60, 61, such that the leading cutting member is bent downwardly to position the leading cutting edge 58 below the trailing cutting edge 58. This is in contrast to the blade 10 described above, which contemplates upward bending of the trailing cutting member.

The leading cutting element 54 of the blade 52, instead of being flat as shown, may include an upturned foil (not shown), to direct clippings cut by the edge 58 into the path of the cutting edge 59. Such a foil could be provided by twisting the element 54 as described in detail below, or could alternately be provided by forming an upturned foil portion (not shown) from the body of the element 54.

Although not shown, a downturned and inturned spur as described above could also be provided in either of the cutting elements, preferably at the ends.

THIRD PREFERRED EMBODIMENT

Figure 10:
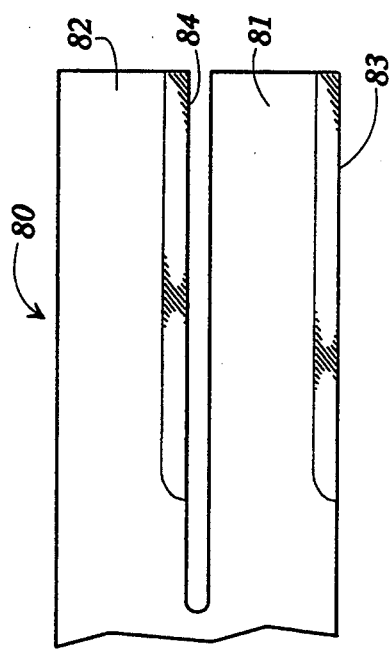
FIG. 10 is a partial top plan view of a second embodiment 80 of a cutting blade according to the present invention.
Figure 11:
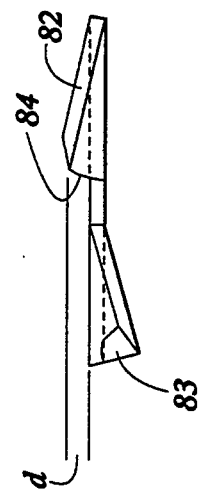
FIG. 11 is a partial end view of the cutting blade 80 of FIG. 10.

Referring now to FIGS. 10 and 11, a third alternative cutting blade embodiment 80 is illustrated. In this embodiment, as shown in FIG. 10, one end of the blade 80 includes forward and trailing cutting elements 81, 82, which are "twisted" such that the end view of such a configuration is illustrated in FIG. 11. As may be seen, this twisted relationship allows the leading cutting element 81 to act as a foil to direct clippings upwardly into the edge 84 of the trailing cutting element 82. It may be seen that at the outer end of the trailing cutting element 82, the inclined edge 84 is a distance "d" from the upper planar surface of the body of the blade 80. As also may be seen, both of the cutting edges are inclined relative to horizontal due to the twisted nature of the cutting members. This embodiment affords mass production advantages due to its simplicity of design.

OTHER EMBODIMENTS/VARIATIONS

It may be understood that, in the industry, it is well known to provide different mounting configurations for different blades of different manufactures. Therefore, one blade of one manufacture may not be mounted upon the lawn mower of a second manufacturer, due to incompatibility of mounting configurations. In the case of the applicant's assignee, a "SNAPPER" mounting configuration is used in which a "U-shaped" cross section is evident in the mounting portion. However, it may be understood that the present invention may also be used in conjunction with other mounting configurations which may not be the same as this mounting configuration. For example, other manufacturers may require "flat" mounting configurations in which the mounting portion of a blade is substantially flat, such as shown in FIGS. 9 and 10.

As described above, in some blade embodiments an upturned foil or flange is used. It may be understood that the inclined angle of the foil may be varied during manufacture to suit particular grass cutting environments. For example, a lower angle could be used for more sensitive grasses, as less air flow may be desired to prevent finer grasses from lying down. In contrast, coarser grasses may require a more pronounced foil angle, as more air flow may be required to move the coarse grass, especially if bagging is desired.

It may also be understood that although one-piece blade designs are shown above, the present invention contemplates multi-part designs which may be attached by welding, riveting, or other methods. Other types of sharpening are also contemplated, such as sharpening of the cutting elements or their other sides, or on both sides.

Manufacture

The blades described above may be hand crafted, or may be manufactured by mass production techniques. One manner of manufacture of the blade 10 described above is to die-cut a flat blank of material, sharpen the flat blank such that the cutting edges are provided, and subsequently to stamp the sharpened blank into the desired final shape. When the blade requires resharpening, this may be seen to be readily possible by conventional techniques.

Materials Used

The material contemplated for use in the above blades may be 8- or 10-guage hot-rolled #1566 steel, or any other conventional blade material, with heat or other treatments such as known in the art.

Cutting Environment

It may be understood that the above cutting blades are configured for use within typical side-discharging or rear-discharging blade housings, with bagging or broadcasting being possible. The blades may also be used in "mulching" or "recycling" blade housing, with equally desirable effects.

Conclusion

Therefore, it may be seen that the present invention provides a grass cutting blade which may be used to bag, broadcast, or mulch grass clippings, which cuts the clippings finely. The grass cutting blade eliminates or minimizes clogging of the clippings on the blade or within the housing, and provides uniform dispersion of the clippings below the cut grass surface when in its "mulching" mode. The grass cutting blade is readily made by mass production techniques, and may be easily resharpened. The grass cutting blade is efficient in its use of power under a variety of cutting conditions.

While this invention has been described in specific detail with reference to the disclosed embodiments, it will be understood that many variations and modifications may be effected within the spirit and scope of the invention as described in the appended claims.

What is claimed is:

1. A grass cutting blade for cutting grass or other vegetation, comprising:
    an elongate body for mounting relative to said rotating shaft;
    a first end defining at least one cutting edge;
    a second end opposing said first end and defining at least one cutting edge and including an inwardly and downwardly directed portion located proximate the outer edge of said second end,
    such that as said blade rotates, grass is clipped by at least one of said cutting edges and directed downwardly and inwardly toward the rotational axis of said blade.

2. The grass cutting blade as claimed in claim 1, wherein said cutting edge on said second end is a first cutting edge on said second end and wherein said downturned and inwardly directed portion at least partially defines a second cutting edge on said second end.

3. The grass cutting blade as claimed in claim 1, wherein said second cutting edge is defined by said outer edge of said second end.

4. The grass cutting blade as claimed in claim 3, wherein said cutting edge on said second end is a first cutting edge on said second end and wherein said downturned and inwardly directed portion at least partially defines a second cutting edge on said second end.

5. The grass cutting blade as claimed in claim 4, wherein said second cutting edge is defined by said outer edge of said second end.

6. The grass cutting blade as claimed in claim 5, wherein said downwardly and inwardly bent corner portion is a spur.

7. The grass cutting blade as claimed in claim 4, wherein said downwardly and inwardly bent corner portion is a spur.

8. A grass cutting blade for cutting grass or other vegetation, comprising:

an elongate body for mounting relative to said rotating shaft;

a first end defining at least one cutting edge;

a second end opposing said first end and defining a leading edge, a trailing edge, and an outside edge, said leading edge defining a cutting edge, said second end also including a downwardly and inwardly bent corner portion located at the intersection of said outer edge and said trailing edge, said downwardly and inwardly bent corner portion defining an inwardly and downwardly directed portion, such that as said blade rotates, grass is clipped by at least one of said cutting edges and directed downwardly and inwardly toward the rotational axis of said blade by said downwardly and inwardly bent corner portion.

9. The grass cutting blade as claimed in claim 8, wherein said downwardly and inwardly bent corner portion is a spur.

* * * * *